US007414829B2

(12) United States Patent
Dixon et al.

(10) Patent No.: US 7,414,829 B2
(45) Date of Patent: Aug. 19, 2008

(54) DEVICES, SYSTEMS, AND METHODS FOR MOUNTING A CIRCUIT BREAKER

(75) Inventors: Joseph Scott Dixon, Suwanee, GA (US); Kristopher Scott Robinson, Atlanta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 298 days.

(21) Appl. No.: 11/428,424

(22) Filed: Jul. 3, 2006

(65) Prior Publication Data

US 2008/0002339 A1 Jan. 3, 2008

(51) Int. Cl.
*H02B 1/04* (2006.01)
*H02B 1/20* (2006.01)

(52) U.S. Cl. ........................ 361/673; 361/634; 361/636; 361/656

(58) Field of Classification Search ................. 361/673, 361/634, 636, 652, 656
See application file for complete search history.

(56) References Cited

U.S. PATENT DOCUMENTS 3,888,560 A * 6/1975 Smith et al. .................. 439/586
4,809,132 A * 2/1989 Palmieri et al. ............. 361/634
5,269,710 A * 12/1993 Donnerstag ................. 439/810
5,434,379 A 7/1995 Hyatt
5,662,491 A 9/1997 Antilla et al.
6,036,542 A * 3/2000 Montague et al. ........... 439/595
6,379,196 B1 4/2002 Greenberg
6,424,519 B2 * 7/2002 Soares et al. ................ 361/608
6,459,570 B1 * 10/2002 Buchanan .................... 361/648
7,372,692 B2 * 5/2008 Ranta et al. ................. 361/641
2005/0057333 A1 3/2005 Subramanian

FOREIGN PATENT DOCUMENTS

DE 202005003820 U1 5/2005

* cited by examiner

*Primary Examiner*—Jayprakash N Gandhi
*Assistant Examiner*—Zachary M Pape

(57) ABSTRACT

Certain exemplary embodiments comprise a mounting base adapted to be snapably coupled to a wiring lug. The wiring lug can comprise a prong, which can be adapted to electrically couple a circuit breaker to the wiring lug. The mounting base can define a chamber adapted to receive the wiring lug.

19 Claims, 5 Drawing Sheets

DEVICES, SYSTEMS, AND METHODS FOR MOUNTING A CIRCUIT BREAKER

BACKGROUND

U.S. Patent Publication No. 20050057333 (Subramanian), which is incorporated by reference herein in its entirety, allegedly recites a "molded insulator cover for a circuit breaker molded case includes a terminal connector attachable to the strap terminal. The terminal connector projects outwardly from the circuit breaker molded case and an insulator discrete from the molded case is disposed around the terminal connector. The insulator is trapped into the circuit breaker molded case by attachment of the terminal connector to the strap terminal. The insulator is configured to be used with a plurality of different field installable terminal connectors." See Abstract.

U.S. Pat. No. 6,379,196 (Greenberg), which is incorporated by reference herein in its entirety, allegedly recites a "termination connector for a circuit breaker is disclosed. The termination connector preferably includes a plurality of single pole screw receiving members integrally attached by a molded housing for unitary attachment to a line or load end of a circuit breaker to assist in holding a nut or nut plate adjacent each screw hole in the circuit breaker's terminal straps. The molded housing preferably includes a line of perforations between each single pole screw receiving member so that the correct number of single pole screw receiving members can be retained and the others can be knocked off along the line of perforations. Provisions are disclosed for adaption of the connector to metric or English standard nut hardware. In addition, the termination connector and circuit breaker are provided with mating attachment devices for providing a simple yet secure connection." See Abstract.

U.S. Patent publication No. 5,434,376 (Hyatt), which is incorporated by reference herein in its entirety, allegedly recites the "present invention provides a terminal and base for connecting a circuit through a fusible switch. The base has a plurality of undercut prongs upstanding therefrom and an interlock snap resiliently attached thereto. The prongs are positioned on the base to prevent movement vertically and in at least one direction horizontally. The snap is positioned on the base to prevent movement in the remaining horizontal directions. The terminal includes a generally planar body made of conductive material. The body has a plurality of edges adapted to insert into the undercut prongs. The terminal positions an opposing edge on the body opposite the plurality of edges. The opposing edge is adapted to abut one end of the interlock snap. The terminal includes a first and second means for electrically and mechanically connecting the terminal to the circuit." See Abstract.

SUMMARY

Certain exemplary embodiments comprise a mounting base adapted to be snapably coupled to a wiring lug. The wiring lug can comprise a prong, which can be adapted to electrically couple a circuit breaker to the wiring lug. The mounting base can define a chamber adapted to receive the wiring lug.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

Figure 1:
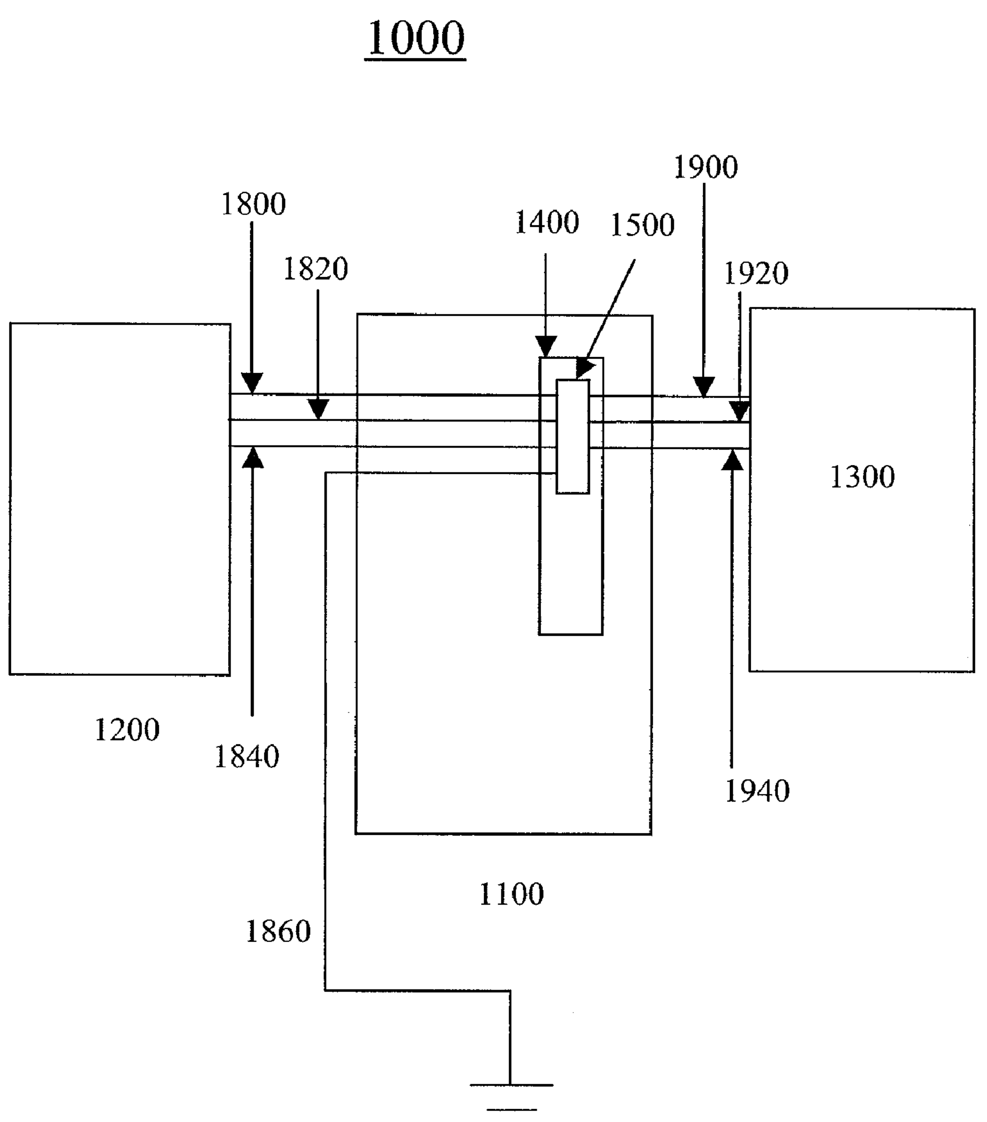
FIG. 1 is a block diagram of an exemplary embodiment of a system 1000.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

adapted to—made suitable or fit for a specific use or situation.

adapter—a device used to effect operative compatibility between different parts of one or more pieces of an apparatus or system.

and/or—either in conjunction with or in alternative to.

aperture—a space or compartment that substantially defines a through-hole.

apparatus—an appliance or device for a particular purpose approximately—nearly the same as.

associate—to join, connect together, and/or relate.

associated with—related to.

attach—to fasten, secure, couple, and/or join.

attachable—capable of being fastened, secured, coupled, and/or joined.

axis—a straight line serving to orient a space or a geometric object.

below—less than in magnitude.

between—in a separating interval.

can—is capable of, in at least some embodiments.

cause—to produce an effect.

chamber—a space that is at least partially defined and surrounded by one or more objects.

change—to correct to a more desired value.

circuit—an electrically conducting pathway.

circuit breaker—a device adapted to automatically open an alternating current electrical circuit.

clip—a springably moveable portion adapted to snapably couple a first object to a second object.

comprising—including but not limited to.

conductive—adapted to transmit.

configure—to make suitable or fit for a specific use or situation.

configured to—capable of performing a particular function.

connect—to join or fasten together.

contact—a coming together of objects.

convert—to transform, adapt, and/or change.

correct—to change to a more desired value.

couple—to join, connect, and/or link together.

coupleable—capable of being joined, connected, and/or linked together.
create—to bring into being.
current—a flow of electrical energy.
define—to establish the outline, form, or structure of.
device—a machine, manufacture, and/or collection thereof.
direction—a distance independent relationship between two points in space that specifies the position of either with respect to the other; the relationship by which the alignment or orientation of any position with respect to any other position is established.
electrical—pertaining to electricity.
electrically coupled—connected in a manner adapted to transfer electrical energy.
electrical panel—a housing adapted to contain electrical components, such as a circuit interrupter, meter, and/or circuit breaker, adapted to manage electrical energy to an electrical device and/or in a circuit.
end—a terminus of something.
energy—usable power.
engage—to interlock or mesh.
fastener—one (or more) restraint that attaches to, extends through, penetrates, and/or holds something. For example, a fastener can be one (or more) bolt and nut assembly, rivet, weldment, nail, screw, peg, staple, clip, buckle, clasp, clamp, hook and loop assembly, adhesive, and/or plastic push rivet, etc.
flange—a protruding edge.
floor—a supporting surface of a structure.
house—to shelter and/or contain.
install—to connect, set in position, and/or prepare for use.
interlock—to unite and/or join closely, such as by hooking and/or dovetailing.
length—a measurement of an extent of something along a greatest dimension.
lip—a rim at least partially surrounding an object and/or a portion thereof.
magnitude—greatness in size and/or extent.
manage—to direct or control.
may—is allowed and/or permitted to, in at least some embodiments.
method—a process, procedure, and/or collection of related activities for accomplishing something.
motion—changing position or place.
mounting base—a device adapted to releasably attach a circuit breaker to an electrical panel.
obtain—to receive, calculate, determine, and/or compute.
occur—to take place.
opposing—positioned and/or located so as to be in positions facing each other and/or acting in opposition to.
parallel—of, relating to, or designating two or more straight coplanar lines that do not intersect.
perpendicular—substantially at a right angle with respect to an axis.
plane—a two-dimensional surface.
plurality—the state of being plural and/or more than one.
predetermined—established in advance.
prevent—to keep an event from happening.
produce—to manufacture or make.
project—to calculate, estimate, or predict.
prong—a projecting part, such as a protrusion, bar, stub, rod, pin, cylinder, etc.
protrusion—something that projects from an object.
provide—to furnish, supply, give, and/or make available.
receive—to take, get, acquire, and/or have bestowed upon.
relative—in comparison with.
releasably—capable of being freed, in a substantially non-destructive manner, from something that binds, fastens, or holds back.
restrain—to limit and/or restrict.
retainer—a device adapted to restrain motion of a retained device in at least one direction.
rotate—to turn about an axis.
secure—to fasten and/or to make firm and/or tight.
select—to make a choice or selection from alternatives.
set—a related plurality.
side—a surface joining a top and bottom of an object.
single—one item.
snapably—to be able to open, close, and/or fit together with a click.
socket—an opening or a cavity into which an inserted part is designed to fit.
substantially—to a great extent or degree.
support—to bear the weight of, especially from below.
system—a collection of mechanisms, devices, data, and/or instructions, the collection designed to perform one or more specific functions.
tool—a device adapted to perform or facilitate mechanical work.
therebetween—in a defined intermediate space.
thermoplastic—a substance that is soft when heated and hard when cooled.
thermoset—a substance that becomes hard and rigid when heated to a curing temperature or cured and remains hard a rigid when cooled and/or reheated to the curing temperature.
through-hole—an aperture defining substantially constant cross sectional shape along a longitudinal axis of each aperture.
user—any person, process, device, program, protocol, and/or system that uses a device.
utilize—to put to use.
via—by way of and/or utilizing.
width—a measurement of an extent of something from a first side to a second side.
wiring lug—a device adapted to electrically couple an electrical conductor to an electrical device (e.g., a circuit breaker).

DETAILED DESCRIPTION

Certain exemplary embodiments provide a mounting base adapted to be snapably coupled to a wiring lug. The wiring lug can comprise a prong, which can be adapted to electrically couple a circuit breaker to the wiring lug. The mounting base can define a chamber adapted to receive the wiring lug.

Certain exemplary embodiments can comprise a mounting base adapted to snapably couple to a wiring lug. The mounting base material can be, for example, a thermoplastic and/or thermoset material. Certain exemplary embodiments can provide lug-alignment and/or circuit breaker alignment features on the mounting base that can result in a relatively strong assembly.

The mounting base can be adapted to retain and/or couple two wiring lugs, which can be snapably coupled to the mounting base. The two wiring lugs can be used for circuit breaker retention and/or to electrically couple the circuit breaker to an electrical source or load. The thermoplastic and/or thermoset material of the mounting base can be utilized to insulate between the circuit breaker and an enclosure that can at least partially surround the circuit breaker.

Certain exemplary embodiments can comprise a plastic mounting base and two wiring lugs. The circuit breaker can be mounted on a prong comprised by the wiring lug. Wires can be releasably coupled to the wiring lug via a fastener. The wiring lug can be positioned above the mounting base at an angle and pressed downward to snapably couple the wiring lug to the mounting base. One or more snaps can be adapted to retain the wiring lug. Certain exemplary embodiments can comprise one or more side snaps, which can be used for low profile retention. Certain exemplary embodiments can comprise one or more end snaps. The one or more snaps can be adapted to retain the lug in three mutually perpendicular directions. For example, the end snap can be adapted to resist motion of the wiring lug in a direction parallel to a plane defined by the prong of the wiring lug. Moreover, side action snaps can be adapted to resist rotational motion about an axis that might allow an undesired uncoupling of the wiring lug from the mounting base. Certain exemplary embodiments can be adapted to resist removal of the lug as the circuit breaker is being uncoupled from the prong of the wiring lug.

FIG. 1 is a block diagram of an exemplary embodiment of a system 1000, which can comprise an electrical panel 1100. Electrical panel 1100 can be utilized to electrically couple an electrical source 1200 to an electrical load 1300. Electrical load 1300 can be associated with a home, factory, office building, commercial warehouse, store, government building, construction site, sports facility, mobile plant, camp site, recreational facility, trailer home, emergency site, and/or farm, etc.

Electrical panel 1100 can comprise a basepan 1400 and one or more circuit breakers 1500. Circuit breaker 1500 can be operably energizable by 100 volts or greater. A first plurality of conductors can electrically couple electrical source 1200 to circuit breaker 1500. The first plurality of conductors can comprise a first source conductor 1800 and a second source conductor 1820. A neutral conductor, 1840, can be electrically coupled to a neutral compartment located inside the electrical panel 1100. A ground 1860 can be electrically coupled to electrical panel 1100. Each of first source conductor 1800 and second source conductor 1820 can be operably connectable to one or more circuit breakers, such as circuit breaker 1500.

A second plurality of conductors can electrically couple electrical load 1300 to circuit breaker 1500. The second plurality of conductors can comprise a first load conductor 1900, a second load conductor 1920, and a neutral load conductor 1940. Each of first load conductor 1900, and second load conductor 1920 can be operably connectable to one or more circuit breakers, such as circuit breaker 1500.

Figure 2:
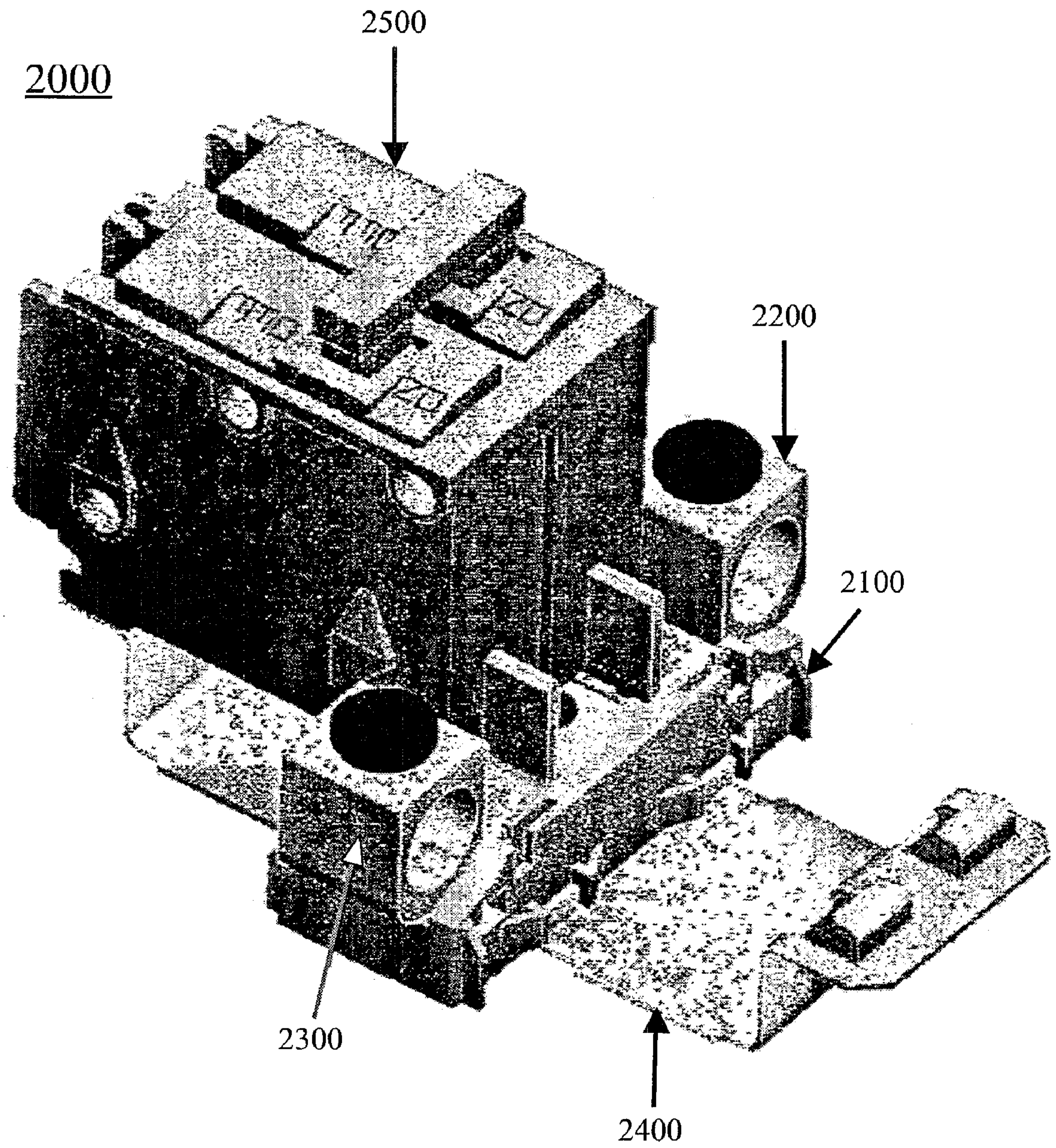
FIG. 2 is a perspective view of an exemplary embodiment of a system 2000.

FIG. 2 is a perspective view of an exemplary embodiment of a system 2000, which can comprise a mounting base 2100. Mounting base 2100 can be adapted to be snapably coupled to a first wiring lug 2200 and/or a second wiring lug 2300. Mounting base 2100 can comprise a floor 2400. A circuit breaker 2500 can be electrically coupleable to first wiring lug 2200 and/or second wiring lug 2300.

Figure 3:
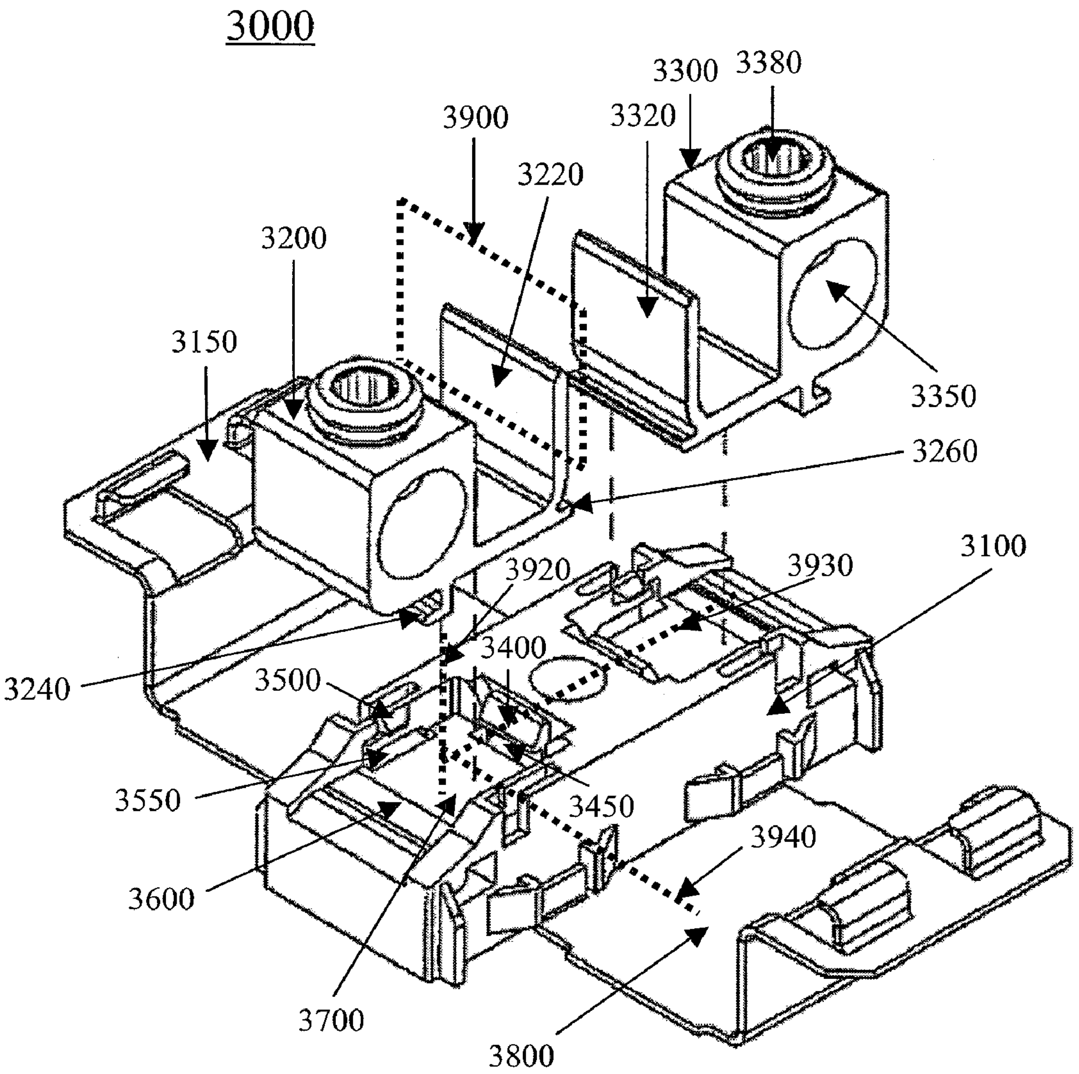
FIG. 3 is a perspective view of an exemplary embodiment of a system 3000.

FIG. 3 is a perspective view of an exemplary embodiment of a system 3000, which can comprise a mount 3150, which can be coupled to, and/or integral with a mounting base 3100. Mounting base 3100 can define one or more chambers, such as chamber 3700. Via the one or more chambers, mounting base 3100 can be adapted to be snapably coupled to a first wiring lug 3200 and/or a second wiring lug 3300. Chamber 3700 can be adapted to receive first wiring lug 3200. Mounting base 3100 can be adapted to be snapably coupled to first wiring lug 3200 and/or second wiring lug 3300.

Mount 3150 can comprise a floor 3800. Mounting base 3100 can comprise of one or more end clips 3400, an end clip lip 3450, one or more side clips, such as side clip 3500, one or more side clip lips, such as side clip lip 3550, and/or an end lip 3600.

Each of first wiring lug 3200 and second wiring lug 3300 can comprise a prong, such as prong 3220 of first wiring lug 3200 and prong 3320 of second wiring lug 3300. Each of prong 3220 and prong 3320 can be adapted to electrically couple a circuit breaker (such as circuit breaker 2500 of FIG. 2) respectively to first wiring lug 3200 and second wiring lug 3300.

Each of first wiring lug 3200 and second wiring lug 3300 can comprise a flange, such as flange 3240 of first wiring lug 3200. Each of first wiring lug 3200 and second wiring lug 3300 can comprise a protrusion, such as protrusion 3260 of first wiring lug 3200. Protrusion 3260 can be adapted to engage end clip 3400 of mounting base 3100.

First wiring lug 3200 can be snapably coupleable to mounting base 3100. For example, flange 3240 can be placed adjacent to, engage, and/or interlock with end lip 3600, thereby defining an axis of substantial contact between flange 3240 and end lip 3600. First wiring lug 3200 can be rotated about the axis of substantial contact toward mounting base 3100. First wiring lug 3200 can come to rest on top surface of end clip 3400 and/or side clip 3500. First wiring lug 3200 can rest within a portion of chamber 3700 and can be snapably and/or releasably coupled to mounting base 3100 via a snapable closure of one or more of end clip 3400, side clip 3500, and/or an opposing side clip (not illustrated) to side clip 3500.

Each of first wiring lug 3200 and second wiring lug 3300 can comprise an aperture, such as aperture 3350 of second wiring lug 3300. Apertures, such as aperture 3350, can be adapted to receive a conductor. The conductor can be adapted to provide electrical energy to a breaker that is electrically coupled to prong 3220 and/or prong 3320 of system 3000. A fastener 3380 can be adapted to releasably attach an electrical conductor to second wiring lug 3300.

Each of prong 3220 and prong 3320 can define a plane, such as plane 3900 defined by prong 3220. System 3000 can be characterized by a first axis 3940, which can be substantially parallel to floor 3800 and substantially parallel to plane 3900. System 3000 can be characterized by a second axis 3920, which can be substantially perpendicular to floor 3800 and substantially parallel to plane 3900. System 3000 can be characterized by a third axis 3930, which can be substantially parallel to floor 3800 and substantially perpendicular to plane 3900.

End clip 3400 can be adapted to restrain motion of wiring lug 3200 relative to mounting base 3100 in a first direction substantially parallel to plane 3900. End clip 3400 can be adapted to restrain first wiring lug 3200 from rotational motion about first axis 3940 substantially parallel to plane 3900 and substantially parallel to floor 3800 of mount 3150. Side clip 3500 can be adapted to restrain motion of first wiring lug 3200 relative to mounting base 3100 in a direction substantially parallel to plane 3900 and rotational motion about third axis 3930. End lip 3600 can be adapted to restrain motion of first wiring lug 3200 relative to mounting base 3100 in a direction substantially parallel to plane 3900 and rotational motion about first axis 3940. Chamber 3700 can be adapted to restrain first wiring lug 3200 from rotational motion about second axis 3920 substantially parallel to plane 3900 and first axis 3940. Flange 3240 can be adapted to restrain first wiring lug 3200 from motion relative to mounting base 3100 in a direction substantially parallel to plane 3900 and rotational motion about first axis 3940.

Once first wiring lug 3200 is snapably coupled to mounting base 3100, end clip lip 3450 can be adapted to restrain motion of first wiring lug 3200 relative to mounting base 3100 in a direction substantially parallel to plane 3900, and rotational motion about first axis 3940. Once first wiring lug 3200 is snapably coupled to mounting base 3100, side clip lip 3550 can be adapted to restrain motion of first wiring lug 3200 relative to mounting base 3100 in a direction substantially parallel to plane 3900, and rotational motion about third axis 3930.

Figure 4:
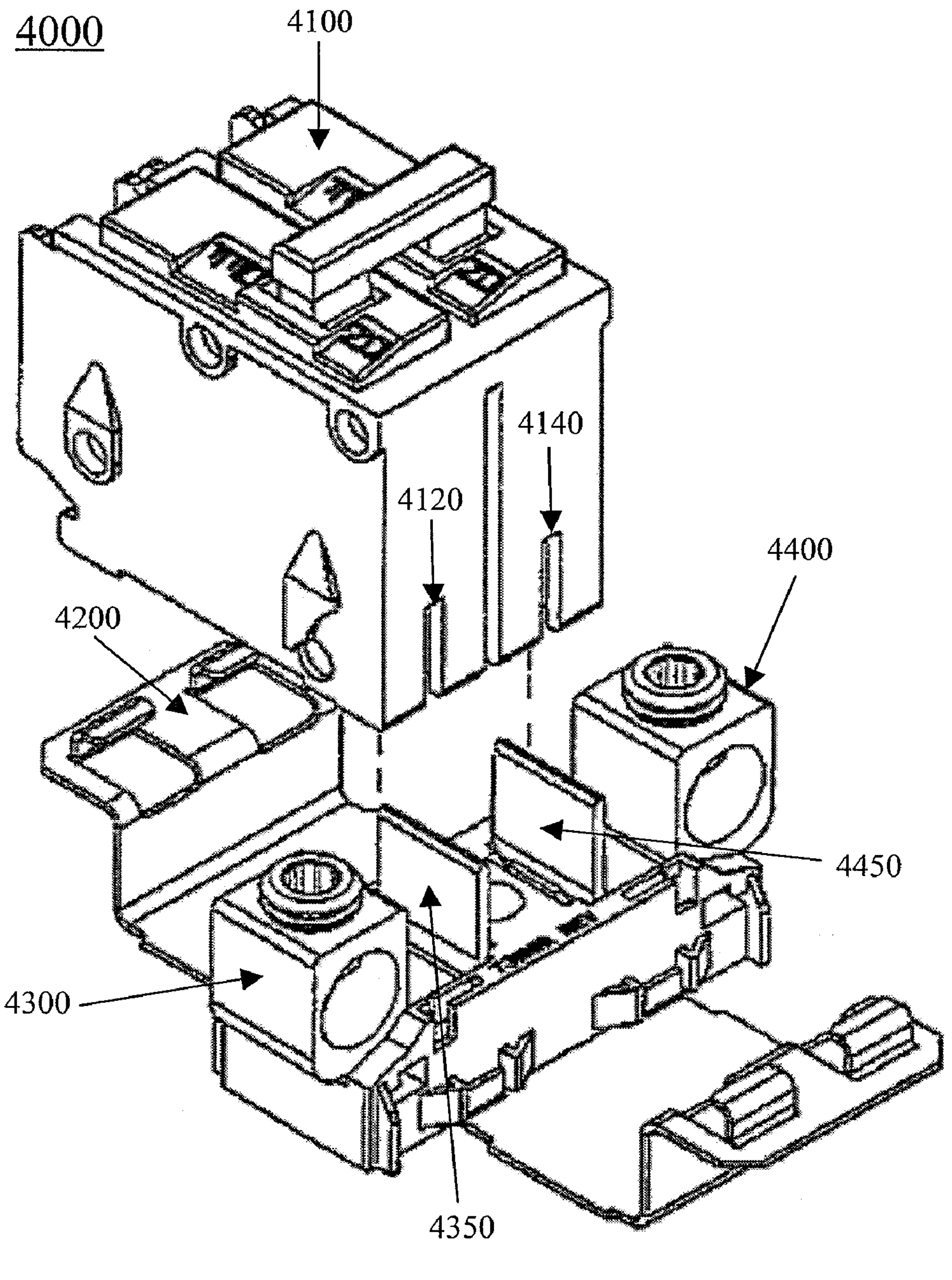
FIG. 4 is a perspective view of an exemplary embodiment of a system 4000.

FIG. 4 is a perspective view of an exemplary embodiment of a system 4000, which can comprise a circuit breaker 4100. Circuit breaker 4100 can define a first receiver 4120 and a second receiver 4140. System 4000 can comprise a mounting base 4200 to which a first wiring lug 4300 and a second wiring lug 4400 can be releasably coupled. First wiring lug 4300 can comprise a prong 4350. Second wiring lug 4400 can comprise a prong 4450. First receiver 4120 can be adapted to mechanically and/or electrically couple circuit breaker 4100 to wiring lug 4300 via prong 4350. Likewise, second receiver 4140 can be adapted to mechanically and/or electrically couple circuit breaker 4100 to wiring lug 4400 via prong 4450.

Figure 5:
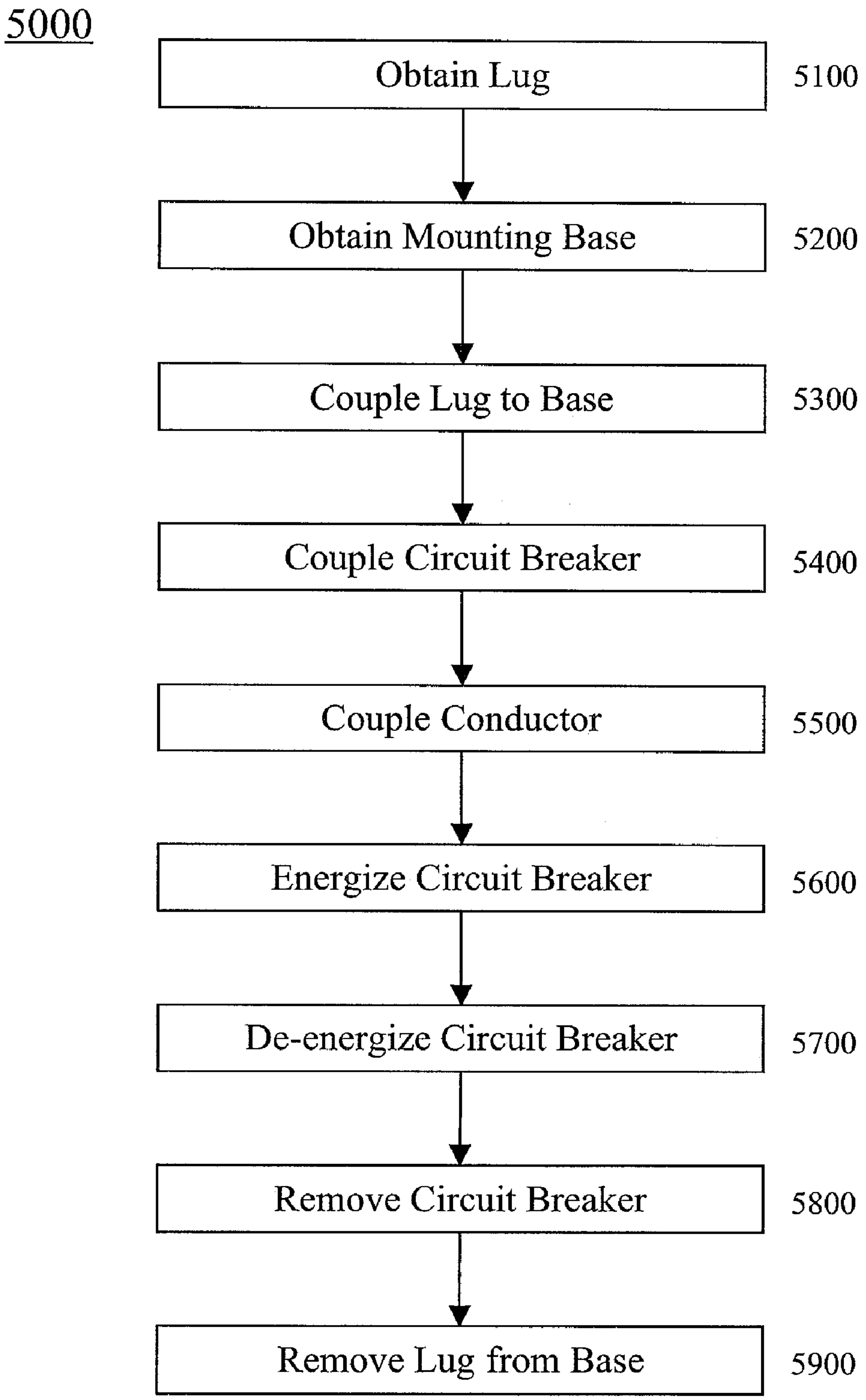
FIG. 5 is a flowchart of an exemplary embodiment of a method 5000.

FIG. 5 is a flowchart of an exemplary embodiment of a method 5000. At activity 5100, a wiring lug can be obtained and/or provided. The wiring lug can comprise a fastener and can be adapted to receive an electrical conductor. The wiring lug can be adapted to be snapably coupleable to a mounting base. The wiring lug can comprise a prong that defines a plane. The prong can be adapted to electrically couple a circuit breaker to the wiring lug.

At activity 5200, a mounting base can be obtained and/or provided. The mounting base can be adapted to be snapably coupled to the wiring lug. The mounting base can define a chamber adapted to receive the wiring lug. The mounting base can comprise an end clip adapted to snapably couple the wiring lug to the mounting base. The end clip can be adapted to restrain motion of the wiring lug relative to the mounting base in a first direction substantially parallel to the plane defined by the prong. The end clip can be adapted to restrain the wiring lug from rotational motion about a first axis substantially parallel to the plane defined by the prong and substantially parallel to a floor associated with the mounting base. The chamber can be adapted to restrain the wiring lug from rotational motion about a second axis substantially parallel to the plane. The second axis can be substantially perpendicular to the floor associated with said mounting base At activity 5300, one or more wiring lugs can be snapably coupled to the mounting base. For example, a flange of the wiring lug can be placed adjacent to a lip of the mounting base, which can define an axis of substantial contact between the wiring lug and the mounting base. The wiring lug can be rotated about the axis of substantial contact to engage one or more snapable closures associated with the mounting base.

At activity 5400, a circuit breaker can be electrically coupled to the one or more wiring lugs. For example, the circuit breaker can be releasably coupled to one or more prongs of one or more wiring lugs. Thereby, the circuit breaker can be releasably coupled to the mounting base.

At activity 5500, a conductor can be coupled to each of the one or more wiring lugs. For example, the conductor can be passed through an aperture associated with the wiring lug. The conductor can be secured with respect to the wiring lug via a fastener, such as a releasable fastener.

At activity 5600, the circuit breaker can be energized with electrical energy. For example, the circuit breaker can be energized with electrical energy greater than approximately 100 volts.

At activity 5700, the circuit breaker can be deenergized and/or decoupled from an electrical energy source. A transfer switch and/or main circuit breaker can be utilized to energize and/or deenergize the circuit breaker.

At activity 5800, the circuit breaker can be removed from the one or more wiring lugs. For example, the circuit breaker can be pried and/or rotatably pulled off of one or more prongs associated with one or more wiring lugs.

At activity 5900, the one or more wiring lugs can be removed from the mounting base. For example, one or more tools can be utilized to release one or more snapable closures from a particular wiring lug. For example, the wiring lug can be rotatably moved about the axis of substantial contact for removal from the mounting base.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- any elements can be integrated, segregated, and/or duplicated;
- any activity can be repeated, performed by multiple entities, and/or performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A system comprising:

a mounting base adapted to be snapably coupled to a wiring lug, said wiring lug comprising a prong that defines a plane, said prong adapted to electrically couple a circuit breaker to said wiring lug, said mounting base defining a chamber adapted to receive said wiring lug, said mounting base comprising an end clip adapted to snapably couple said wiring lug to said mounting base, said end clip adapted to restrain motion of said wiring lug relative to said mounting base in a first direction substantially parallel to said plane, said end clip adapted to restrain said wiring lug from rotational motion about a first axis substantially parallel to said plane and substantially parallel to a floor of said mounting base, said chamber adapted to restrain said wiring lug from rotational motion about a second axis substantially parallel to said plane, said second axis substantially perpendicular to the floor.

2. The system of claim 1, further comprising:

said wiring lug.

3. The system of claim 1, further comprising:

said circuit breaker.

4. The system of claim 1, further comprising:

an electrical panel adapted to house said mounting base.

5. The system of claim 1, wherein said mounting base comprises at least one side clip adapted to snapably couple said wiring lug to said mounting base, said at least one side clip adapted to restrain motion of said wiring lug relative to said mounting base in said first direction substantially parallel to said plane.

6. The system of claim 1, wherein said mounting base comprises two opposing side clips, each of said two opposing side clips adapted to snapably couple said wiring lug to said mounting base, said two opposing side clips adapted to restrain motion of said wiring lug relative to said mounting base in said first direction substantially parallel to said plane.

7. The system of claim 1, wherein said wiring lug comprises a flange adapted to interlock with said mounting base, when said wiring lug is snapably coupled to said mounting base, said flange adapted to restrain said wiring lug from motion relative to said mounting base in a direction substantially parallel to said plane.

8. The system of claim 1, wherein said wiring lug is adapted to engage said mounting base along a lip comprised by said mounting base, said wiring lug adapted to snapably couple to said mounting base via a rotation about an axis of substantial contact between said wiring lug and said mounting base at said lip.

9. The system of claim 1, wherein said wiring lug comprises a flange adapted to interlock with a lip of said mounting base, an axis of substantial contact definable by an engagement of said lip and said flange, said wiring lug adapted to snapably couple to said mounting base via a rotation about said axis.

10. The system of claim 1, wherein said mounting base comprises a lip, said lip adapted to restrain motion of said wiring lug relative to said mounting base in a second direction substantially parallel to said plane.

11. The system of claim 1, wherein said wiring lug comprises a fastener adapted to releasably attach an electrical conductor to said wiring lug.

12. The system of claim 1, wherein said mounting base is adapted to snapably couple two wiring lugs.

13. The system of claim 1, wherein said wiring lug comprises a protrusion adapted to engage said end clip.

14. The system of claim 1, wherein said wiring lug comprises an aperture adapted to receive an electrical conductor.

15. A system comprising:

a wiring lug; and a mounting base adapted to be snapably coupled to said wiring lug, said wiring lug comprising a prong that defines a plane, said prong adapted to electrically couple a circuit breaker to said wiring lug, said mounting base defining a chamber adapted to receive said wiring lug, said mounting base comprising an end clip adapted to snapably couple said wiring lug to said mounting base, said end clip adapted to restrain motion of said wiring lug relative to said mounting base in a first direction substantially parallel to said plane, said end clip adapted to restrain said wiring lug from rotational motion about a first axis substantially parallel to said plane and substantially parallel to a floor of said mounting base, said chamber adapted to restrain said wiring lug from rotational motion about a second axis substantially parallel to said plane, said second axis substantially perpendicular to the floor.

16. A method comprising a plurality of activities, comprising:

installing a mounting base adapted to be snapably coupled to a wiring lug, said wiring lug comprising a prong that defines a plane, said prong adapted to electrically couple a circuit breaker to said wiring lug, said mounting base defining a chamber adapted to receive said wiring lug, said mounting base comprising an end clip adapted to snapably couple said wiring lug to said mounting base, said end clip adapted to restrain motion of said wiring lug relative to said mounting base in a first direction substantially parallel to said plane, said end clip adapted to restrain said wiring lug from rotational motion about a first axis substantially parallel to said plane and substantially parallel to a floor associated with said mounting base, said chamber adapted to restrain said wiring lug from rotational motion about a second axis substantially parallel to said plane, said second axis substantially perpendicular to the floor.

17. The method of claim 16, further comprising:

snapably coupling said wiring lug to said mounting base.

18. The method of claim 16, further comprising:

releasably coupling said circuit breaker to said mounting base.

19. The method of claim 16, further comprising:

electrically coupling an electrical conductor to said wiring lug.

* * * * *